United States Patent
Duan et al.

(10) Patent No.: US 7,864,550 B2
(45) Date of Patent: Jan. 4, 2011

(54) POWER ADAPTER WITH VOLTAGE-STABILIZED COMPENSATION

(75) Inventors: Jian-Hua Duan, Shanghai (CN); Rui-Xia Fei, Shanghai (CN); Shao-Hua Fang, Shanghai (CN); Qing-Hua Su, Shanghai (CN)

(73) Assignee: BCD Semiconductor Manufacturing Limited (KY)

( * ) Notice: Subject to any disclaimer, the term of this patent is extended or adjusted under 35 U.S.C. 154(b) by 283 days.

(21) Appl. No.: 12/265,535

(22) Filed: Nov. 5, 2008

(65) Prior Publication Data
US 2010/0110735 A1    May 6, 2010

(51) Int. Cl.
*H02M 3/335*    (2006.01)
(52) U.S. Cl. .................. 363/21.16; 363/21.12
(58) Field of Classification Search .................. 363/15, 363/16, 20, 21.01, 21.08, 21.1, 21.12, 21.16, 363/21.18
See application file for complete search history.

(56) References Cited

U.S. PATENT DOCUMENTS

| | | | | |
|---|---|---|---|---|
| 4,763,236 A | * | 8/1988 | Usui | 363/19 |
| 5,138,543 A | * | 8/1992 | Harm et al. | 363/21.08 |
| 5,909,363 A | * | 6/1999 | Yoon | 363/21.16 |
| 6,396,717 B2 | * | 5/2002 | Yasumura | 363/21.02 |
| 6,515,876 B2 | * | 2/2003 | Koike et al. | 363/21.16 |
| 2008/0130325 A1 | * | 6/2008 | Ye | 363/21.14 |

* cited by examiner

*Primary Examiner*—Matthew V Nguyen
(74) *Attorney, Agent, or Firm*—Muncy, Geissler, Olds & Lowe, PLLC

(57) ABSTRACT

A power adapter with voltage-stabilized compensation includes a pulse frequency modulation circuit to generate a driving pulse which has a variable OFF time interval to control power transformed and output by a transformer. The power adapter also has an ancillary coil to induce a feedback signal on the secondary coil of the transformer. The pulse frequency modulation circuit includes a time interval modulation unit to receive the feedback signal and a feedback compensation unit. The time interval modulation unit sets a level voltage compared with the feedback signal to generate a sample signal to modulate the OFF time interval. The feedback compensation unit provides a compensation signal to the time interval modulation unit to change the size of the feedback signal or sample signal thereby to compensate the voltage output from the secondary side.

9 Claims, 6 Drawing Sheets

POWER ADAPTER WITH VOLTAGE-STABILIZED COMPENSATION

FIELD OF THE INVENTION

The present invention relates to a power adapter with voltage-stabilized compensation and particularly to a control circuit adopted for use on power adapters or changers.

BACKGROUND OF THE INVENTION

Please referring to FIG. 1, a conventional power adapter (or charger) generally includes a transformer 101 which has circuits divided into a primary side and a secondary side. The primary side has a power switch 103 and a pulse-width modulation (PWM) unit 100. The PWM unit 100 generates a driving pulse to set the power switch 103 ON or OFF. Through a coupling element 102 a feedback signal is sent from the secondary side to the primary side to control energy sent through the transformer 101 to the secondary side. The secondary side delivers output through a cable to an external electric device. However to deliver output at a constant voltage the cable will incur about +/−10% of voltage drop. Hence on the conventional circuit the secondary side usually has an impedance compensation circuit 104 to alter the impedance of the output end to attain the constant voltage. Such an approach requires more elements and results in a higher cost. The circuit board also is bigger. There are still rooms for improvement.

SUMMARY OF THE INVENTION

In view of the disadvantages occurred to the conventional transformer with compensation of output voltage taking place on the secondary side, such as more elements, higher cost and bigger size, the primary object of the present invention is to provide a control circuit at the primary side to control power of the primary side and compensate the voltage output from the secondary side.

The invention provides a power adapter with voltage-stabilized compensation. It includes a transformer which has a primary coil to receive input power and transmit energy to a secondary coil to provide output power. The power adapter further has a pulse frequency modulation circuit to generate a driving pulse which has a constant ON time interval and a variable OFF time interval to control the power transformed and output by the transformer. The invention provides more features as follow: the power adapter has an ancillary coil coupled magnetically with the secondary coil of the transformer to be induced to generate a feedback signal. The pulse frequency modulation circuit has a feedback contact, a time interval modulation unit to receive the feedback signal through the feedback contact and a feedback compensation unit. The time interval modulation unit sets a level voltage compared with the feedback signal to generate a sample signal to modulate the OFF time interval. The feedback compensation unit provides a compensation signal to the time interval modulation unit to change the size of the feedback signal or sample signal. As a result, the feedback signal or sample signal alters according to change of loads, and the power sent from the primary coil to the secondary coil is adjusted to compensate the voltage output from the secondary side.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
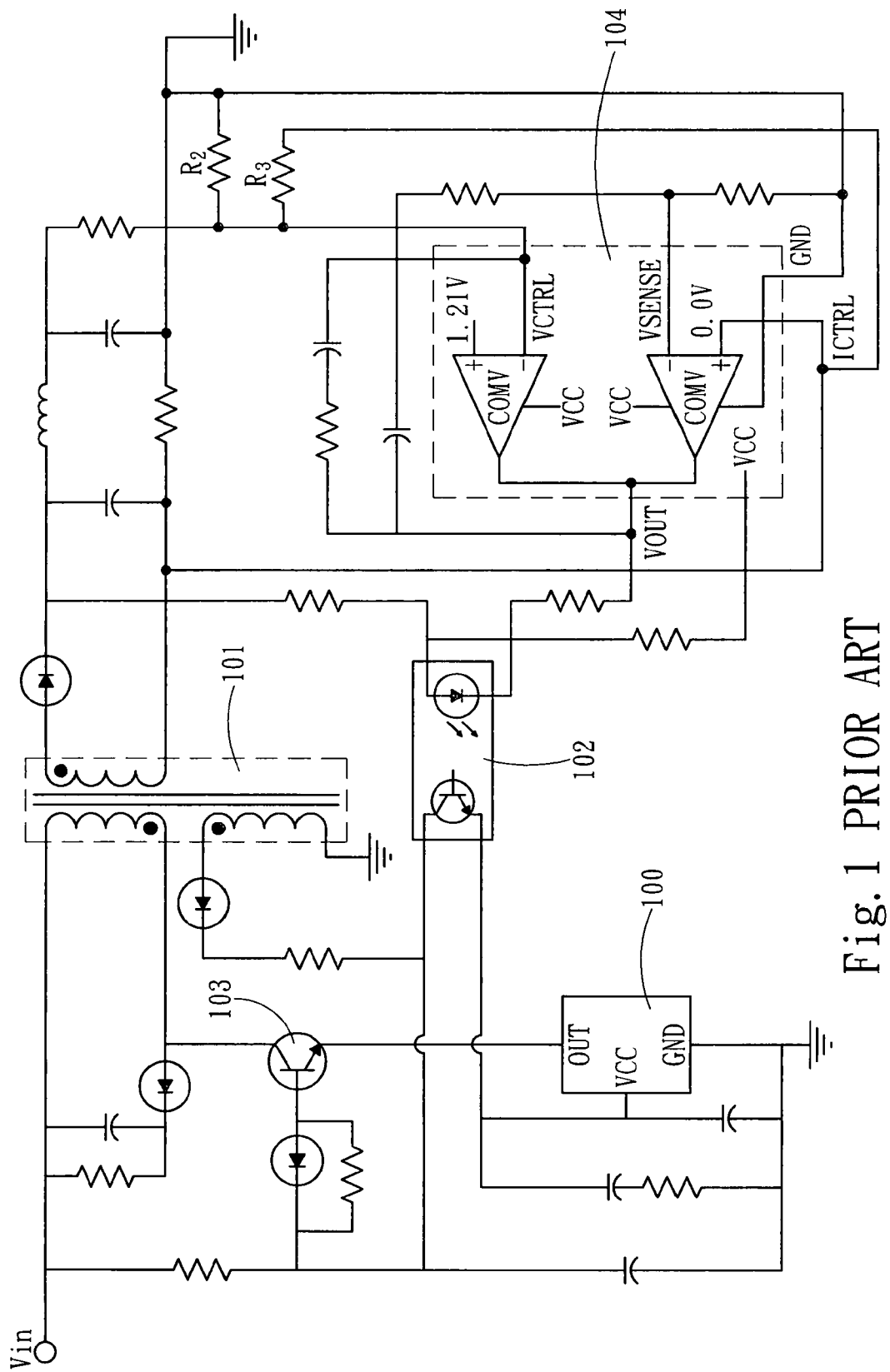
FIG. 1 is a schematic structure of a conventional power adapter.
Figure 2:
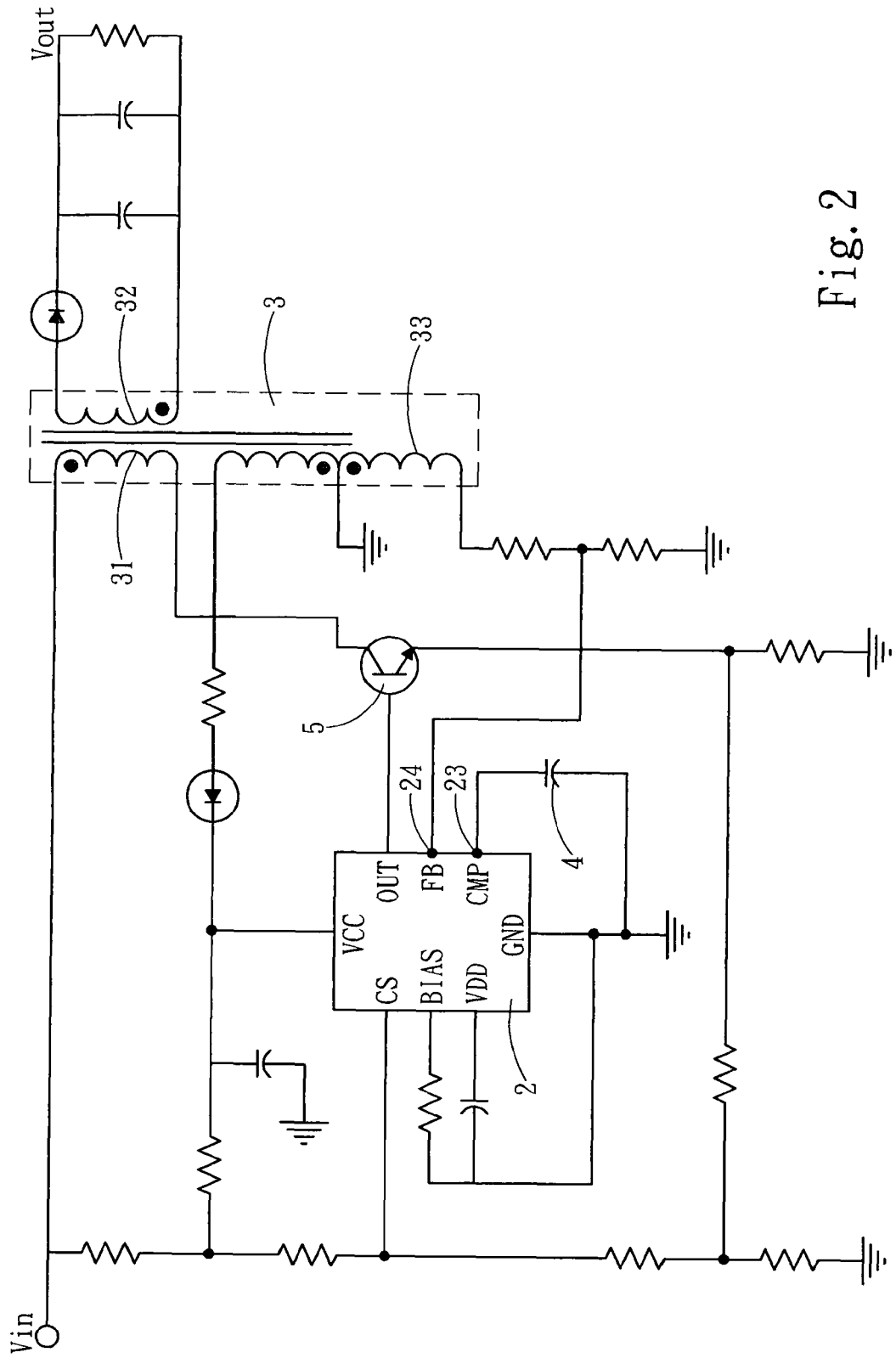
FIG. 2 is a schematic structure of the power adapter according to the invention.
Figure 3:
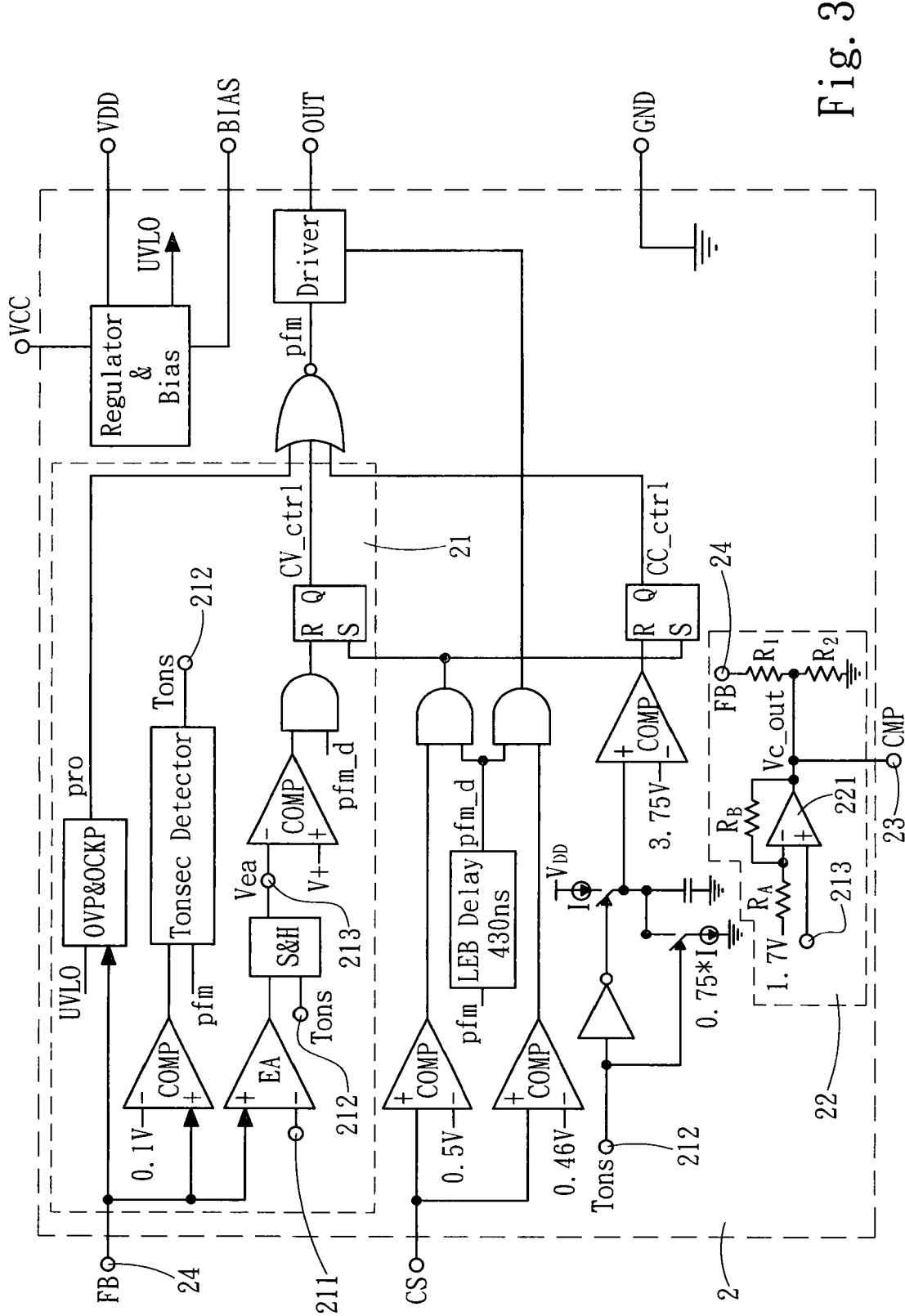
FIG. 3 is a circuit diagram of an embodiment of the pulse frequency modulation circuit according to the invention.

Please refer to FIG. 2 for the structure of the power adapter of the invention. The power adapter includes a transformer 3 which has a primary coil 31 to receive input power (Vin) and transmit energy to a secondary coil 32 to provide output power (Vout). The input power passes through the primary coil 31 at a period controlled by ON/OFF of a power switch 5. The power switch 5 is driven by a pulse frequency modulation circuit 2. The pulse frequency modulation circuit 2 generates a driving pulse which has a constant ON time interval and a variable OFF time interval. The driving pulse drives the power switch 5 linked to an output end (OUT) of the pulse frequency modulation circuit 2 to control power transformed and output by the transformer 3. The invention provides more features as follow: the power adapter has an ancillary coil 33 coupled magnetically with the secondary coil 32 of the transformer 3 to be induced to generate a feedback signal. The pulse frequency modulation circuit 2 has a feedback contact 24, a time interval modulation unit 21 (referring to FIGS. 3, 4 or 5) to receive the feedback signal through the feedback contact 24 and a feedback compensation unit 22 (also referring to FIGS. 3, 4 or 5). The feedback compensation unit 22 is connected to a compensation contact 23. The compensation contact 23 is connected to a capacitor 4 to store energy and maintain the voltage level. Refer to FIG. 3 for an embodiment of the pulse frequency modulation circuit 2 of the invention. The pulse frequency modulation circuit 2 includes the time interval modulation unit 21 and the feedback compensation unit 22. The time interval modulation unit 21 is connected to the feedback contact 24 (FB) to receive the feedback signal. The time interval modulation unit 21 further includes a time series circuit (Tonsec Detector) to provide an ON time series signal 212 (Tons) and a level voltage contact 211 connecting to a constant voltage source and setting a level voltage. The level voltage and the feedback signal are compared, and by sampling and processing the ON time series signal a sample signal 213 (Vea) is generated to modulate the driving pulse. The feedback compensation unit 22 provides a compensation signal to the time interval modulation unit 21 to change the size of the feedback signal or sample signal 213. The feedback compensation unit 22 includes a rail to rail operational amplifier 221 and a plurality of resistors $R_A$, $R_B$, $R_1$ and $R_2$. The feedback compensation unit 22 receives a first signal and generates the compensation signal through the rail to rail operational amplifier 221 and the resistors. In the embodiment shown in FIG. 3, the feedback compensation unit 22 receives the sample signal 213 (Vea) as the first signal input to the rail to rail operational amplifier 221. The compensation signal generated by the feedback compensation unit 22 can be got through the formula as follow:

$$Vc\_out = (1 + R_B/R_A) \times Vea - R_B/R_A \times 1.7$$

where 1.7 is a processing level parameter set by the rail to rail operational amplifier 221.

By means of the formula set forth above, Vc_out can be obtained as the compensation signal. By altering the resistors $R_B$ and $R_A$ the level of the compensation signal can be adjusted. Through the voltage division of the resistors R1 and R2 at the rear end, a voltage can be got as follow:

$$(1 + R_1/R_2) \times Vc\_out$$

The feedback compensation unit 22 is electrically connected to the feedback contact so that the compensation signal output from the feedback compensation unit 22 is directed to the feedback contact (FB) to compensate the feedback signal. When the load current at the secondary side of the transformer 3 rises, the loss at the secondary side also increases. But due to the compensation of the feedback signal output voltage also rise linearly. Thus output compensation is attained when the load changes.

Figure 4:
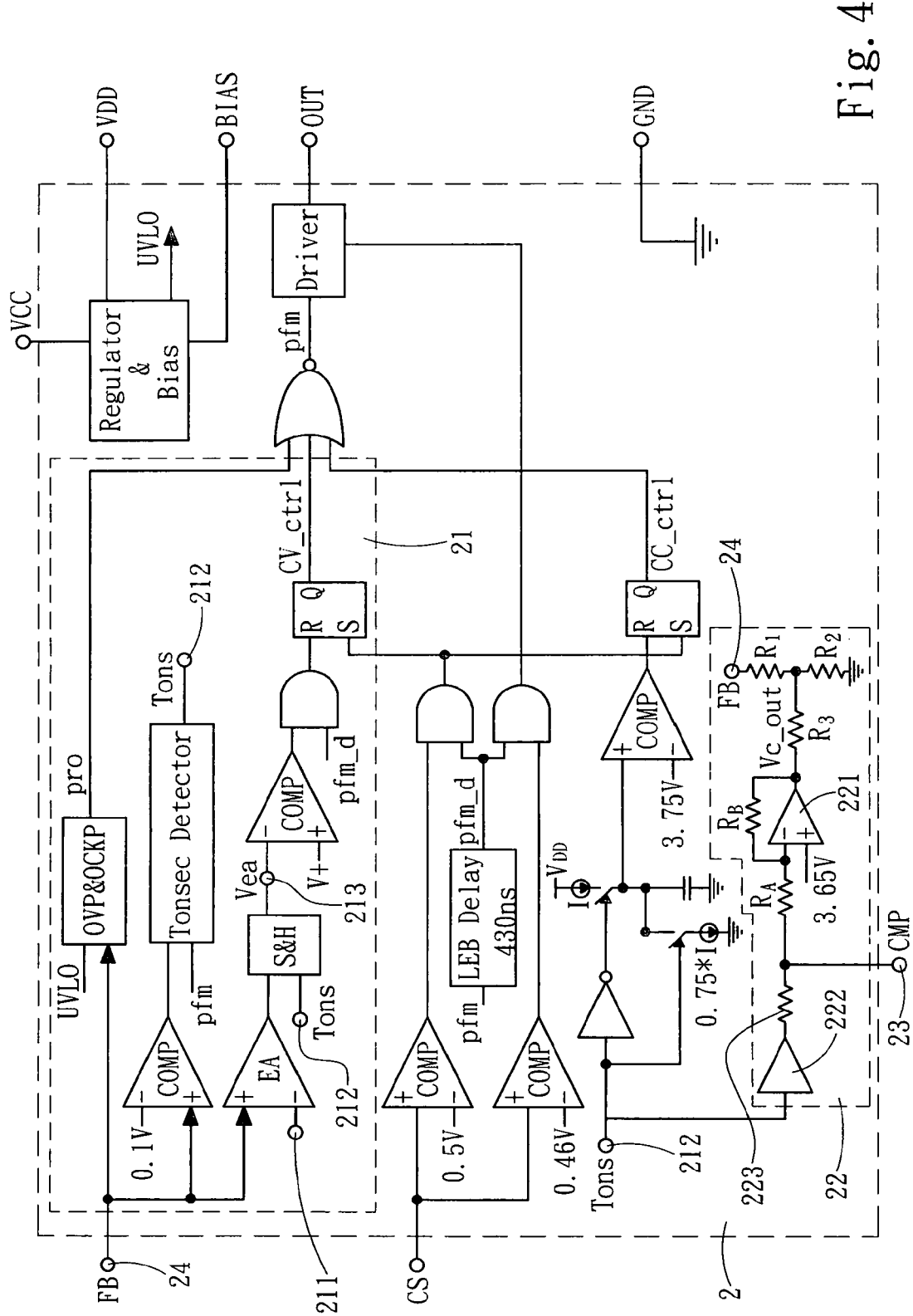
FIG. 4 is a circuit diagram of another embodiment of the pulse frequency modulation circuit according to the invention.

Refer to FIG. 4 for another embodiment of the invention. The time interval modulation unit 21 is same as the one shown in FIG. 3, and also provides the same function. However, the feedback compensation unit 22 in FIG. 4 can get the ON time series signal 212 as the first signal for processing. The feedback compensation unit 22 also has a low pass filter which consists of a register 222, a resistor 223 and the capacitor 4 connecting to the compensation contact 23. The low pass filter transforms the ON time series signal 212 to a DC voltage. Through the rail to rail operational amplifier 221 and the following formula:

$$Vc\_out = (1 + R_B/R_A) \times 3.65 - R_B/R_A \times V_{CMP}$$

where $V_{CMP}$ is the voltage formed at the compensation contact 23 when the ON time series signal 212 passes through the low pass filter and converted; Vc_out is got and sent back to the feedback contact (FB) through the component of voltage of a network consisting of resistors $R_1$, $R_2$ and $R_3$.

When the load increases, the frequency of the ON time series signal 212 also increases. And the voltage transformed from the ON time series signal 212 also increases to change and compensate the voltage of the feedback contact, thus output can be stabilized.

Figure 5:
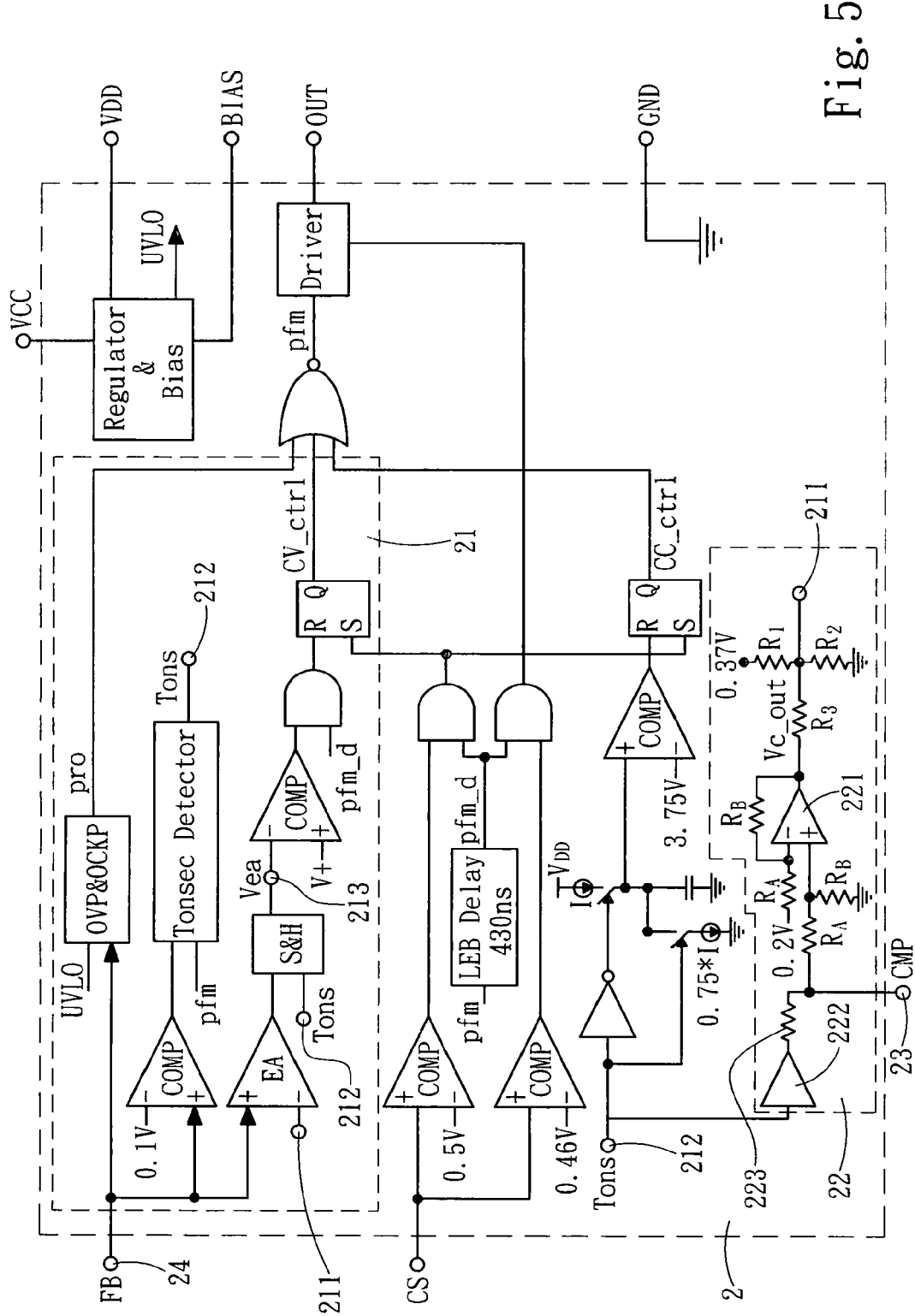
FIG. 5 is a circuit diagram of yet another embodiment of the pulse frequency modulation circuit according to the invention.

Refer to FIG. 5 for yet another embodiment of the invention. The feedback compensation unit 22 also can compensate the voltage at the level voltage contact 211 to change the size of the sample signal 213. The feedback compensation unit 22 also receives the ON time series signal 212 and transforms to a DC voltage through the low pass filter, and gets the following result through the rail to rail operational amplifier 221:

$$Vc\_out = R_B/R_A \times (V_{CMP} - 0.2)$$

where $V_{CMP}$ is the voltage formed at the compensation contact 23 when the ON time series signal 212 passes through the low pass filter and transformed. It differs from the previous embodiment by compensating the compensation signal Vc_out at the level voltage contact 211 to modulate the sample signal 213 (Vea), thereby adjusts output.

Figure 6:
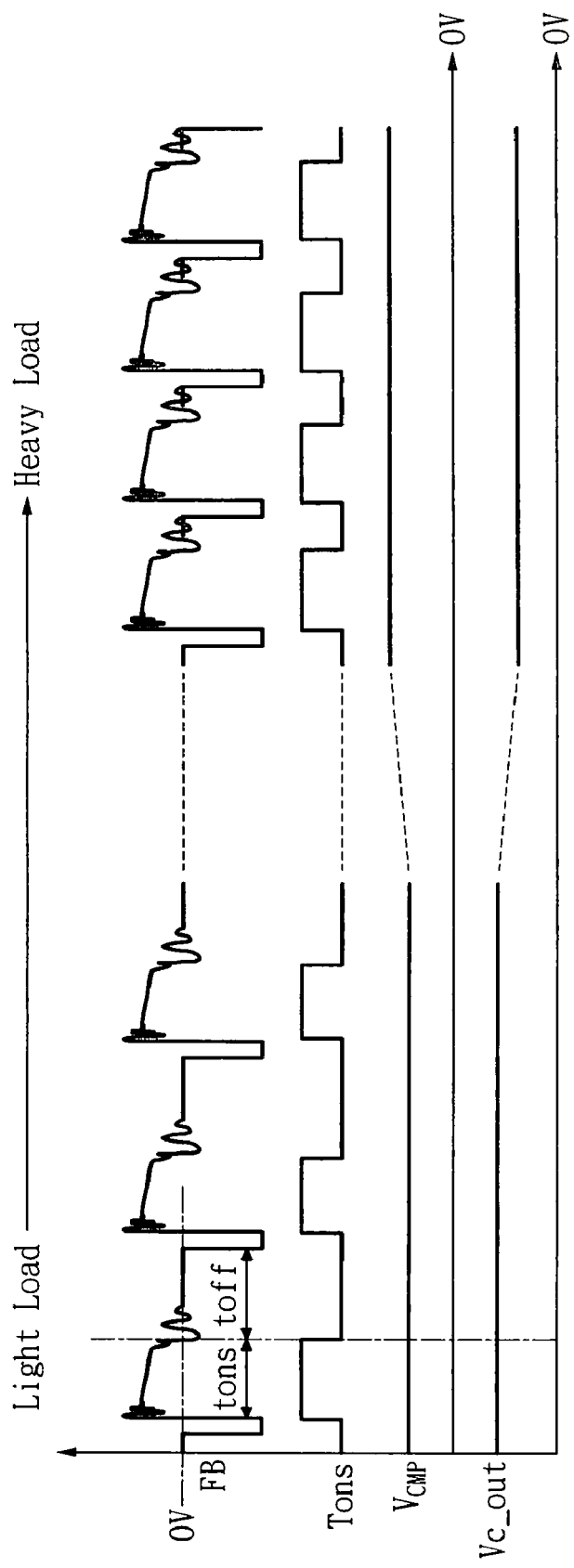
FIG. 6 is a power waveform chart according to another embodiment shown in FIG. 4.

By means of the embodiments previously discussed, the feedback signal or sample signal 213 can be compensated with increasing of the load to compensate output. Refer to FIG. 6 for the node waveform chart of the embodiment shown in FIG. 4. The compensation signal Vc_out changes with alterations of the load. When the load is light the compensation signal Vc_out drops linearly to alter the level of the feedback signal and compensate output.

As a conclusion, the invention includes the feedback compensation unit 22 in the pulse frequency modulation circuit 2. The electronic elements being used to achieve compensation are smaller size and cost less. It provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power adapter with voltage-stabilized compensation including a transformer which has a primary coil to receive input power and transmit energy to a secondary coil to deliver output power and a pulse frequency modulation circuit to generate a driving pulse which has a constant ON time interval and a variable OFF time interval to control power transformed and output by the transformer, the power adapter further comprising:
   an ancillary coil which is magnetically coupled with the secondary coil and induced to generate a feedback signal;
   wherein the pulse frequency modulation circuit has a feedback contact, a time interval modulation unit to receive the feedback signal through the feedback contact and a feedback compensation unit; the time interval modulation unit setting a level voltage compared with the feedback signal to generate a sample signal to modulate the OFF time interval, the feedback compensation unit providing a compensation signal to the time interval modulation unit to alter the size of the feedback signal or the sample signal.

2. The power adapter of claim 1, wherein the feedback compensation unit is connected to a compensation contact which is connected to a capacitor.

3. The power adapter of claim 1, wherein the pulse frequency modulation circuit further includes a time series circuit to provide an ON time series signal, the time interval modulation unit receiving the ON time series signal and processing to generate the driving pulse.

4. The power adapter of claim 3, wherein the feedback compensation unit includes a rail to rail operational amplifier and a plurality of resistors, and receives a first signal and generates the compensation signal through modulation of the rail to rail operational amplifier and the resistors.

5. The power adapter of claim 4, wherein the first signal is the ON time series signal.

6. The power adapter of claim 5, wherein the feedback compensation unit is electrically connected to the feedback contact to output the compensation signal to change the level of the feedback signal.

7. The power adapter of claim 5, wherein the feedback compensation unit is electrically connected to the time interval modulation unit to output the compensation signal to change the level of the sample signal.

8. The power adapter of claim 4, wherein the first signal is the sample signal.

9. The power adapter of claim 8, wherein the feedback compensation unit is electrically connected to the feedback contact to output the compensation signal to change the level of the feedback signal.

* * * * *